Oct. 1, 1946.    T. S. BRISKIN ET AL    2,408,506
REVERSIBLE CLUTCH
Filed July 27, 1944    3 Sheets-Sheet 1

Inventors:
Joseph Charles Zivny
Alvin Edward Schellschmidt
Julian Joseph Golick
Theodore S. Briskin
By: Zabel, Carlson, Fitzhugh & Wells
Attorneys Oct. 1, 1946.　　T. S. BRISKIN ET AL　　2,408,506
REVERSIBLE CLUTCH
Filed July 27, 1944　　3 Sheets-Sheet 2

Inventors:
Joseph Charles Zivny
Alvin Edward Schellschmidt
Julian Joseph Golick
By: Theodore S. Briskin
Zabel, Carlson, Dithbugh & Wells
Attorneys Oct. 1, 1946.                T. S. BRISKIN ET AL                2,408,506
                              REVERSIBLE CLUTCH
                           Filed July 27, 1944            3 Sheets-Sheet 3

Inventors:
Joseph Charles Zivny
Alvin Edward Schellschmidt
Julian Joseph Golick
Theodore S. Briskin
By Zabel, Carlson, Greitzbaugh & Wells
Attorneys Patented Oct. 1, 1946

2,408,506

UNITED STATES PATENT OFFICE 2,408,506

REVERSIBLE CLUTCH

Theodore S. Briskin, Joseph Charles Zivny, Alvin Edward Schellschmidt, and Julian Joseph Golick, Chicago, Ill., assignors to Excel Auto Radiator Company, Chicago, Ill., a corporation of Delaware Application July 27, 1944, Serial No. 546,818

8 Claims. (Cl. 192—44)

This invention relates to improvements in overrunning clutches and in particular to an overrunning clutch, the action of which is reversible.

An overrunning clutch generally comprises two rotatable elements together with means to cause a torque to be applied from one of said elements to the other when the tendency to slip occurs in one direction but not in the other. In the usual application one of the elements is considered a driving element and the other the driven element, and the torque will be transmitted from the driving to the driven element at all times except when there is a negative load on the driven element or unless the direction of rotation of the driving element is reversed.

It is a principal object of this invention to provide a clutch which is operative as an overrunning clutch irrespective of the direction of rotation of the driven element.

A further object of this invention is to provide an improved overrunning clutch having a plurality of clutching or locking elements, the arrangement of the parts being such that all of said clutching or locking elements are effective.

Another object is to provide an improved clutch which may be rendered operative or inoperative by control means which shift the clutching elements into or out of operative position.

Still another object is to provide an improved construction for clutches of the roller bearing or free wheeling type, which construction embodies comparatively few parts and is positive in its action.

Various other objects, features and advantages will become apparent as the description proceeds.

With reference now to the drawings in which like reference numerals designate like parts, Fig. 1 is an elevation of a preferred embodiment of this invention, a portion being broken away to show the underlying parts;

Figure 1:
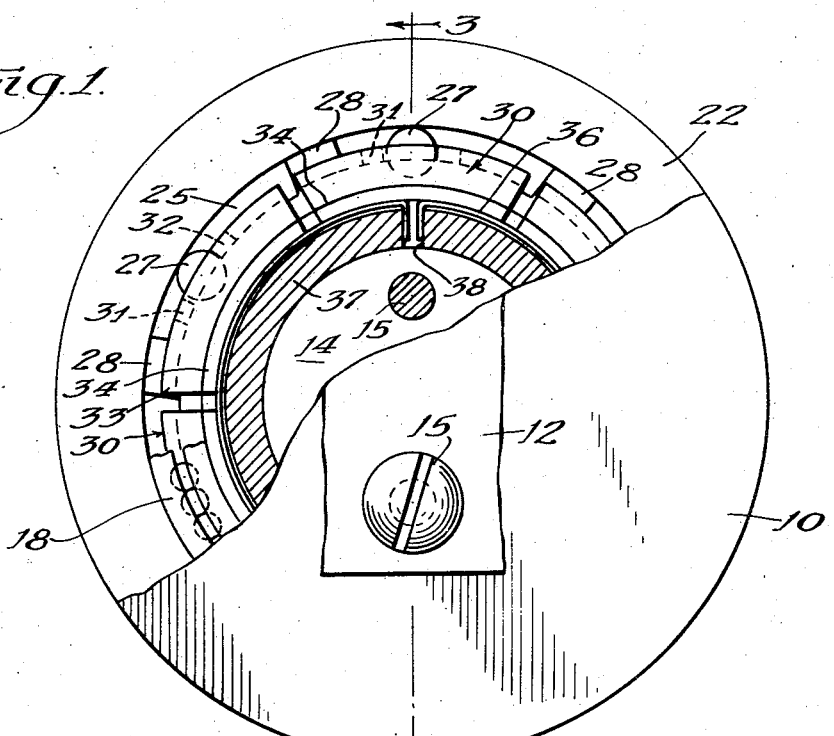

The clutch as herein shown is generally of cylindrical shape and comprises two end members 10 and 11 which are supported between two supports 12 and 13. The end members are spaced from each other by a core 14 and the five parts above listed are secured together by means of a plurality of bolts 15, each of which extends through a support and an end member and is threaded into the core. A portion of the core is cut away to accommodate a pinion 16 which is secured to a drive shaft 17, the latter extending through the support 13 and being journaled in the end member 11.

The end members 10 and 11 are provided with shoulders 20 and 21, respectively, on which shoulders are mounted ball-bearing sets designated generally by the reference numerals 18 and 19, respectively. A driven member 22 in the form of a ring is mounted on the ball-bearing sets 18 and 19.

There is a press fit between the ball-bearing sets and the shoulders and between the ball-bearing sets and the driven member 22. The driven member is herein shown in the form of a belt pulley, but it will be understood that if desired it may be provided with gear teeth, or any other expedient may be used to transmit the torque from the driven member to the apparatus. It will be seen that the arrangement of the parts above described is such that the driven member 22 will rotate freely in either direction.

Radially outwardly of the core 14 is disposed a driving member in the form of an internal ring gear 24 having a plurality of peripheral cavities 25 which are bounded by arc shaped inner walls 26 and the inner cylindrical surface of the driven member 22. These cavities 25 are separated by radially disposed spacers 28 by means of which the internal gear 24 is centered or journaled within the driven member 22. The internal gear meshes with and is driven by the pinion 16.

Figure 2:
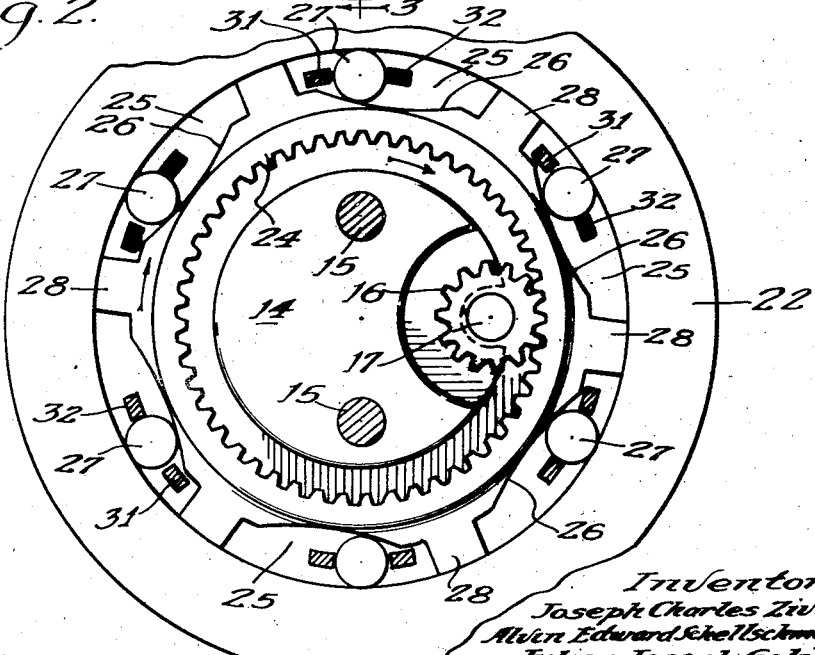
Fig. 2 is a section of the device shown in Fig. 1 taken along line 2—2 of Fig. 3.

Torque is transmitted from the internal gear 24 to the driven member 22 by means of clutching or locking elements in the form of rollers 27. As shown in Fig. 2, the rollers are wedged between the inner walls 26 of the cavities and the inner surface of the driven member 22 in such a manner that clockwise rotation of the ring gear will be transmitted to the driven member. If the rollers were positioned at the clockwise extremity of the cavities 25 counterclockwise rotation of the internal gear would be transmitted to the driven member. In other words, the clutch would operate in either direction because the cavities are tapered at both ends.

Control means, in the form of a plurality of roller positioning segments 30, are provided to position the rollers at either the counterclockwise or the clockwise ends of the cavities 25 in order to secure operation of the clutch in clockwise or counterclockwise directions, respectively. The segments 30 comprise a segmental shaped body member 33 having two projecting lugs 31 and 32 which are adapted to embrace a roller 27 with a slight clearance. Each segment also includes a rearwardly extending portion 34 which is in the form of a section of a hollow cylinder. These rearwardly extending portions 34 fit within the inner race member 35 of the ball-bearing set 18 and are held thereagainst by means of a spring 36. It will be noted that the spring 36 is disposed just outwardly of a circular boss 37 formed on the end member 10, the boss being slotted as indicated at 38 to accommodate the bent in ends of the spring 36. The spring 36 urges each one of the segments outwardly against the stationary inner race 35 so that there is a frictional contact between the segments and the stationary member. This tends to make the segments lag behind the internal gear 24 during rotation of the latter.

For instance, if the internal gear is rotating in a clockwise direction this frictional drag or lag will cause the segments 30 to be positioned toward the counterclockwise end of the cavities 25, thereby maintaining the rollers 27 in a position for the transmission of clockwise torque. Of course, when the lost motion between the internal gear and the segments has been taken up the segments will be carried along with the other parts due to the engagement of the lug 32 with the roller 27.

If the driven member 22 tends to overrun the internal gear 24, as by the application of a negative load thereto, the rollers 27 will tend to be moved out of their wedged position. As soon as this occurs however the rollers no longer transmit torque from one of the elements to the other and the driven element 22 is free to overrun.

If the direction of rotation of the internal gear is reversed however the segments will be shifted to the clockwise end of the cavities 25 and the driven member 22 will then be rotated in the counterclockwise direction. In other words, the position of the segments 30 with respect to the cavities 25 is not affected by any change in the direction of rotation of the driven element 22 but is determined solely by the direction of the relative rotation between the driving member and another member which in this instance is a stationary member—the inner race 35.

With a clutch of this construction torque may be transmitted in either direction, the position of the rollers being shifted from one end of the cavity to the other automatically as the direction of rotation of the driving member is shifted. The arrangement of the parts however is such that the driven member is permitted to overrun in the same direction of rotation as the driven member is rotating or was rotating.

The locking positions of the rollers 27 with respect to their respective cavities 25 may vary from one cavity to the other due to minor inaccuracies in the machining of the parts. Such variation is permitted by mounting each pair of lugs, 31 and 32, on separate segments, the ultimate position of each segment being independently determined with respect to the others. Thus, each roller is permitted to seek its own locking position, and all rollers are effective torque transmitting elements.

Figure 5:
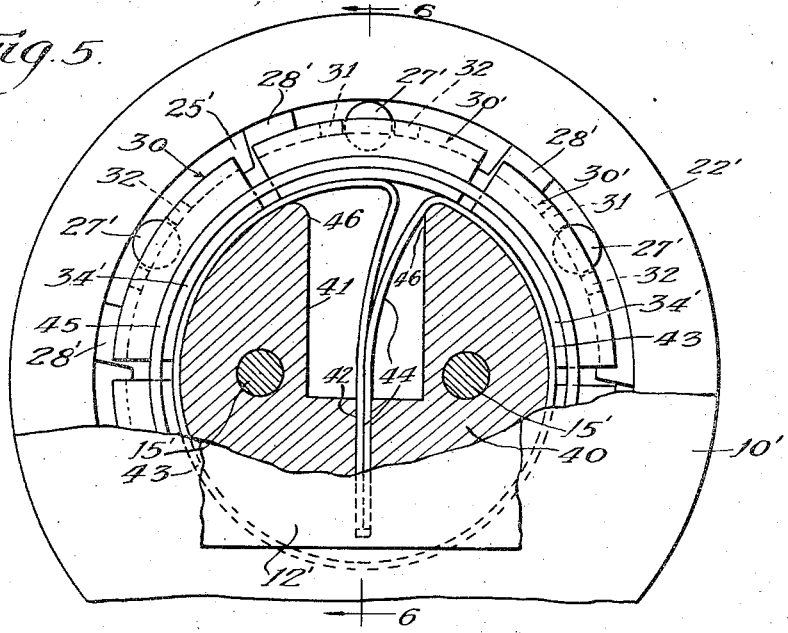
Figs. 5 and 6 are sections showing a modification.
Figure 6:
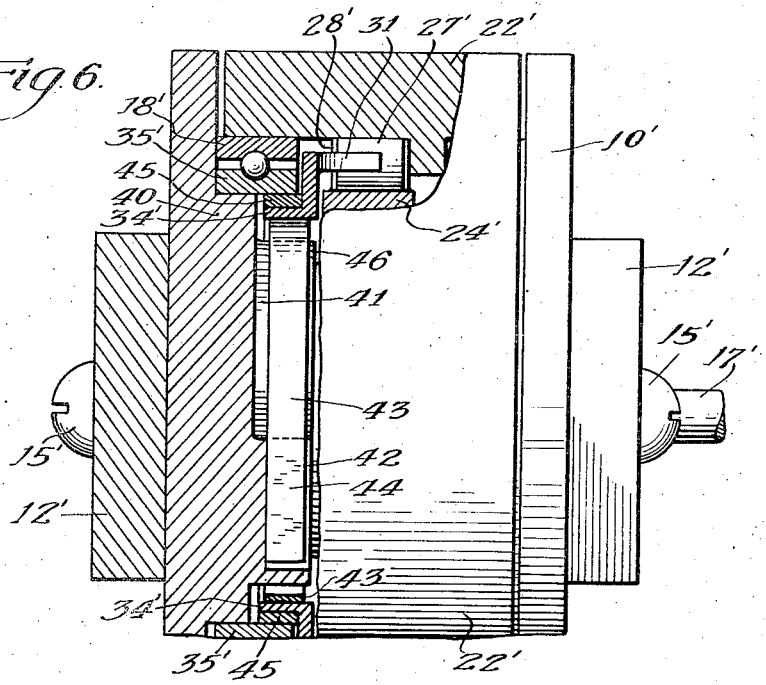

In the modification shown in Figs. 5 and 6, a slightly different means has been provided for mounting the segments 30'. This modified arrangement keeps a bias on the segments after the internal gear 24' has come to a stop. Thus the rollers 27' may be maintained in clutched position, and the driven member 22' can be rotated in the same direction as it previously had been driven. However the driven member cannot be rotated in the reverse direction because the rollers 27' are biased into clutched position.

Figure 3:
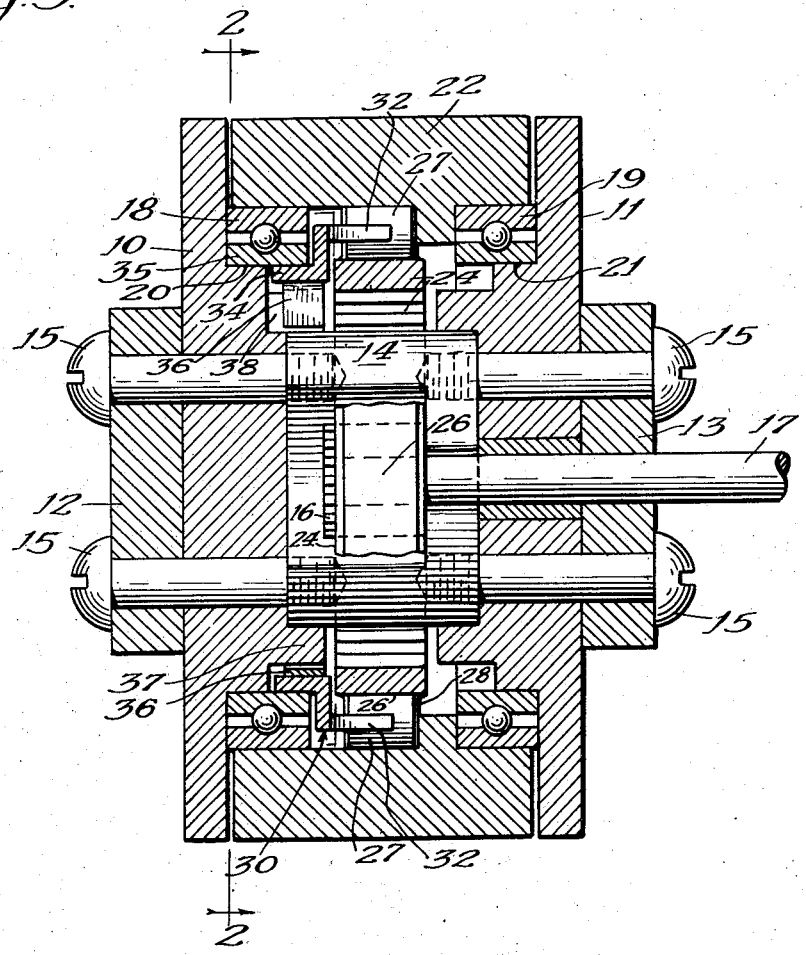
Fig. 3 is a section taken along line 3—3 of Fig. 1.
Figure 4:
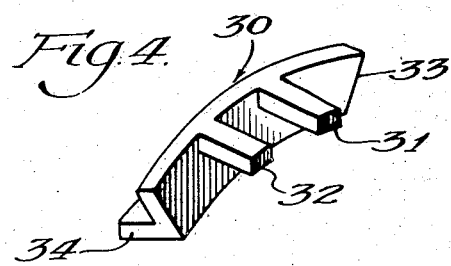
Fig. 4 is a detailed perspective view of one of the roller positioning segments.

Those parts of Figs. 5 and 6 which are identical to corresponding parts of Figs. 1 to 3 are indicated by the same reference numeral primed.

End member 10' is provided with a boss 40 which has cut into it a U-shaped recess 41 at the bottom of which is a slot 42. A spring 43 surrounds the boss and is provided with bent in ends 44 which extend into the recess 41 and are received in slot 42. The segments 30' are confined between a ring 45 and spring 43 so that the frictional drag which determines the position of the rollers 27' is between the spring 43 and the segments 30'. Preferably there is a slight clearance between the ring 45 and the inner race member 35' which permits free rotation of the ring under certain circumstances. This rotation is limited in extent by the abutting of the ends 44 with corner 45 or corner 46 of recess 41.

In operation it will be seen that as the internal gear 24' starts to rotate in the clockwise direction, the ring 45 and the segments 30' will remain stationary until the rollers 27' are wedged into the clockwise end of the cavities 25', after which the segments will begin to rotate with the driven member 22'. The ring 45 and the spring 43 will be dragged by the segments 30' until such time as the bent portions 44 of the spring 43 contact the corner 46. Thereafter, spring 43 will rotate no further, and the slippage between the segments 30' and spring 43 will create the drag which maintains the segments at the counterclockwise end of the cavities, in the same manner as described in connection with Figures 1 to 3. When internal gear 24' stops however, the bias of the bent portions 44 of the spring will cause the segments and hence rollers 27' to be maintained in wedged position as shown in Fig. 5. Thus the driven member 22' can overrun in the same direction, but not in the reverse direction. Fig. 5 shows the parts in this position.

When internal gear 24' is rotated in the reverse direction, the bent portions 44 are flexed in the other direction so that after internal gear 24' comes to rest, the segments will maintain the rollers 27' in the clockwise ends of cavities 25'.

Although only a preferred embodiment of this invention has been shown herein it will be understood that various modifications and changes may be made therein without departing from the spirit of this invention. The foregoing descriptions and the drawings are deemed to be illustrative only and the invention is to be defined only by the appended claims.

We claim:

1. A reversible overrunning clutch, comprising an annular rotatable member, an internal ring gear journalled therein, a stationary member on which said annular member is journalled, said ring gear being formed with a peripheral recess which cooperates with the inner surface of said driven member to form a cavity which tapers at both ends, a roller disposed within said cavity and adapted to be wedged at either end of said cavity between the tapering walls thereof, and roller positioning means including a member projecting into said cavity and engaging the roller disposed therein to maintain it at one end of said cavity or the other and having a portion which is maintained in frictional contact with said stationary member whereby the position of said roller in said cavity will be determined by the direction of rotation of said ring gear.

2. A reversible overrunning clutch, comprising a driving member in the form of an internal ring gear, a driven member disposed exteriorly thereof, a stationary member on which said driven member is journaled, said ring gear being formed with recesses in the periphery thereof which cooperate with the inner surface of said driven member to form a plurality of cavities which taper at both ends, rollers disposed within said cavities, and roller positioning means comprising a segment for each cavity, each segment being provided with arms extending into its corresponding cavity and embracing the roller disposed therein, and having a portion which is maintained in frictional contact with said stationary member whereby the position of the rollers in said cavities will be determined by the direction of rotation of said ring gear.

3. A reversible overrunning clutch, comprising an annular driven member, a driving member gear journaled in said driven member, a stationary support on which said driven member is journaled, said driving member being formed with recesses in the periphery thereof which cooperate with the inner surface of said driven member to form a plurality of cavities which taper at both ends, clutching elements disposed within said cavities and adapted to be wedged at one or the other of the ends of said cavities for transmitting torque in the forward or reverse direction, respectively, and positioning means for said clutching elements comprising a segment for each cavity, each segment being provided with a projection extending into a corresponding cavity and engaging the clutching element disposed therein, said segments being mounted for rotation with said driving member, and means to shift the positions of said segments with respect to said driving member whereby the positions of said clutching members in said cavities will be determined by the direction of rotation of said driving member.

4. A reversible overrunning clutch, comprising a driving member in the form of an internal ring gear, a driven member disposed exteriorly thereof, a stationary support on which said driven member is journaled, said ring gear being formed with recesses in the periphery thereof which cooperate with the inner surface of said driven member to form a plurality of cavities which taper at both ends, rollers disposed within said cavities, and roller positioning means comprising a segment for each cavity, each segment being provided with arms extending into a corresponding cavity and embracing the roller disposed therein, said segments having portions extending into proximity to said stationary member, and a spring for urging said portions into frictional contact with said stationary member whereby the position of the rollers in said cavities will be determined by the direction of rotation of said ring gear.

5. A reversible free wheeling clutch, comprising a driving member, a driven member, a plurality of locking elements associated with said driving member and capable of assuming with respect thereto a forward driving position and a reverse driving position in each of which said locking elements lock said driven member to said driving member in unidirectional torque transmitting relationship, separate positioning members, each one engaging a different locking element to shift each locking element individually from said forward driving position to reverse driving position, and resilient means adapted to be displaced to a limited extent to one side or the other of a neutral position, and being frictionally associated with all of said positioning members whereby the operation of said positioning members is controlled by the direction of the tendency toward slippage between said driving member and said frictional means.

6. A reversible overrunning clutch, comprising a driving member in the form of an internal ring gear, a driven member disposed exteriorly thereof, said ring gear being formed with recesses in the periphery thereof which cooperate with the inner surface of said driven member to form a plurality of cavities which taper at both ends, rollers disposed within said cavities, roller positioning means comprising a segment for each cavity, each segment being provided with arms extending into a corresponding cavity and embracing the roller disposed therein, a ring positioned adjacent to said segments, said segments having portions extending into proximity to said ring, and a spring for urging said segments into frictional contact with said ring, the assembly comprising said ring, segments, and spring being mounted for displacement against the bias of said spring to a comparatively small extent to either side of a neutral position, beyond which slippage occurs between said spring and said segments as said segments rotate with said driven member whereby a bias is maintained by said spring on said segments after said driven member has come to a stop.

7. In a reversible free wheeling clutch of the type having two independently rotatable elements provided with oppositely disposed surfaces which are shaped to form a plurality of cavities and a plurality of clutch elements in said cavities, positioning means for said clutch elements by means of which unidirectional clutching action may be exerted alternatively in opposite directions, comprising a separate positioning member engaging each clutching element, and a common member independently mounted with respect to said rotatable elements and frictionally engaging all of said positioning elements whereby each of said clutching elements is free to seek an operative position in its respective cavity.

8. In a reversible free wheeling clutch of the type having two independently rotatable elements provided with oppositely disposed surfaces which are shaped to form a plurality of cavities and a plurality of clutching elements in said cavities, positioning means for said clutching elements by means of which unidirectional clutching action may be exerted alternatively in opposite directions, comprising a separate positioning member engaging each clutching element, a common member independently mounted with respect to said rotatable elements and frictionally engaging all of said positioning elements, and means to bias said common member toward a neutral position whereby said positioning members and clutching elements are maintained in operative clutching position even though the parts are stationary.

THEODORE S. BRISKIN.
JOSEPH CHARLES ZIVNY.
ALVIN EDWARD SCHELLSCHMIDT.
JULIAN JOSEPH GOLICK.